Patented Feb. 13, 1945

2,369,379

UNITED STATES PATENT OFFICE 2,369,379

RESIN COMPOSITION

Neil E. Tillotson, Watertown, Mass.

No Drawing. Application December 22, 1942,
Serial No. 469,816

5 Claims. (Cl. 106—172)

This invention relates to resin compositions and more particularly to compositions containing resins having the properties of those obtained from the cativo tree (*Prioria capaifera*) or similar resins obtained from related trees.

The apparent major source of the resin or gum at present is from the tree above mentioned but other botanically similar trees yield resins which are similar in their characteristics. The cativo tree is found in large numbers generally throughout Central America including Colombia and the Canal Zone. The gum or resin can be obtained from the tree by tapping, and as obtained from the tree is a viscous, sticky liquid or semi-liquid of amber or brown color resembling honey in its physical characteristics and appears to be an oleo resin consisting essentially of resin acids of high molecular weight. Among the important properties of the resin are the stickiness or adhesiveness mentioned above which enables it to impart adhesive properties or tackiness to various compositions. Another important property is its excellent stability, that is, the resin is substantially non-oxidizing and resists thermal decomposition at high temperatures. It has a high boiling point, i. e., above 400° C., and can be boiled at atmospheric temperature without apparent thermal decomposition. In fact, it exhibits no evidence of thermal decomposition deleteriously affecting its properties at temperatures considerably above its boiling point. In its natural state it has a somewhat disagreeable odor but this odor is largely eliminated upon heating to the boiling point, either at atmospheric pressure or at sub-atmospheric pressure, and allowing a small amount of vapors to escape, indicating the presence of a small amount of essential oils or other highly volatile odoriferous material. After escape of such volatile material, the remaining resin has a substantially constant boiling point and can be distilled, either at atmospheric or sub-atmospheric pressure, to leave a small amount of brown or darker colored residue indicating that the composition is probably essentially a single chemical compound. The distillate is a water white, viscous, sticky liquid at atmospheric temperature similar except for color and odor to the original resin obtained from the tree. Elevated temperatures decrease the viscosity of either the natural material or the distilled material.

For many compositions the resin as obtained from the tree is suitable after straining to remove extraneous material such as leaves, bark, etc., usually while heated, to reduce its viscosity. As stated above, heating and allowing vapors to escape will also largely eliminate the disagreeable odor. The distilled product, however, retains to a large extent the properties of the crude resin and is particularly suitable for light colored compositions.

An analysis of a typical sample of crude cativo resin gave the following results:

| | |
|---|---:|
| Ash _____per cent__ | 0.25 |
| Protein (NX6.25) _____do____ | 0.24 |
| Volatile at 105° C_____do____ | 1.60 |
| Acid number_____ | 143.7 |
| Total ether extract_____per cent__ | 100 |
| Saponification number_____ | 163.3 |
| Iodine number_____ | 92.6 |
| Unsaponifiables_____per cent__ | 7.43 |

The same resin when distilled to produce a water white distillate free from volatile ash, etc., gave an acid number of 177.1 and a saponification number of 179.2.

The crude resin as well as the distilled resin is soluble in many organic solvents including hydrocarbon solvents. Thus one part of resin was found to be completely soluble in five parts of ethyl alcohol, butyl alcohol, ethyl acetate, toluene, petroleum ether, and carbon tetrachloride. The crude resin is incompletely soluble in acetone, the insoluble portion representing approximately 3% of the total resin.

Another important property is its resistance to flame, probably due to its resistance to oxidation. The resin will char at extremely high temperatures but it is very difficult to make the resin flame. Because of its resistance to reaction with oxygen it is not a drying material and also has resistance to aging as it does not change its properties after long contact with the atmosphere.

The resin, either in its crude or distilled form, reacts readily with magnesium and calcium oxide to produce a hard, brittle solid and in general reacts with alkaline earth oxides. It also reacts with zinc oxide but only at elevated temperatures and then at a slow rate. The reaction with magnesium oxide takes place rapidly even at room temperature while the reaction with calcium oxide is somewhat slower. The resulting products are thermo-plastic and when softened or melted by the application of heat become sticky or tacky similar to the original resin. By employing lesser amounts of such oxides, semi-liquid or less brittle thermo-plastic solids can be produced. The resin also reacts or vulcanizes with sulfur. This reaction produces a more viscous, sticky liquid or plastic, or thermo-plastic solid depending upon the proportions of sulfur and conditions of vulcanization. A thermo-plastic solid resembling gutta percha in its physical characteristics can be produced by employing sufficient sulfur. The reaction with sulfur responds to vulcanization accelerators in substantially the same manner as is the case in the vulcanization of rubber. Thus, by employing known or suitable rubber vulcanization accelerators and temperatures, the rate and extent of vulcanization can be controlled in substantially any desired manner. Elevated temperatures with appropriate proportions of sulfur or accelerators, or both, can be employed to produce the desired vulcanization either in conjunction with or in the absence of fillers or inert materials or the presence or absence of other vulcanizable materials such as rubber or rubber-like materials. By reaction with sulfur, the resin may thus be rendered more viscous or be converted into a plastic material which still retains its stickiness. By more drastic vulcanizing treatment, a hard thermo-plastic solid having a relatively high melting point can be produced which upon being softened or melted by the application of heat again becomes sticky or tacky. Excellent adherence of this hard solid to other materials can be obtained by vulcanizing the original resin to the hard state in contact with such other materials, or cooling a heat softened or melted, previously vulcanized hard resin in contact with such other materials.

Conjoint reaction with the oxides mentioned above and sulfur can be carried out to produce products having various properties. In general the employment of sulfur or other vulcanizing agents results in products resembling gutta percha whereas the employment of the oxides results in products having more rosin-like or more brittle physical properties. By varying the proportions of vulcanizing agents to oxides, products can be obtained having properties intermediate those above described. Substantially similar results can be obtained by first reacting the resin with sulfur and then the oxides, or vice versa.

The resin also reacts with alkaline compounds of alkali metals. The reaction with such compounds ordinarily does not produce much change in physical characteristics. Thus sodium hydroxide, for example, may be employed to neutralize the acidity of the resin without much change in physical characteristics although the chemical properties are in general somewhat changed. The reaction product with alkali metals may still be vulcanized with sulfur or other vulcanizing agents although the curing time and temperature is usually increased. The resin or reaction products discussed above are not soluble in water but may be rather easily emulsified or suspended in water in finely divided form. Thus substantially any of the emulsifying agents which tend to produce an oil-in-water emulsion may be employed for this purpose.

The resin and certain of its reaction products are particularly suitable as an ingredient in compositions containing rubber or rubber-like materials. Thus, incorporation of small amounts of the resin in elastomer compositions provides improved plasticity and tackiness or stickiness of compositions containing rubber or rubber-like material either when employed as adhesives or during fabrication of the articles to be vulcanized. Also, after vulcanization the presence of the resin provides an improved bond between the plies of the rubber or rubber-like material or an improved bond between the rubber and other materials. This is in adidtion to rendering the unvulcanized rubber or rubber-like vulcanizable compositions more tacky and easier to mill and mix with various compounding ingredients. Thus the present invention is of major utility with respect to rubber or rubber-like vulcanizable compositions which are deficient in the tackiness and plasticity which are necessary for the successful building up of coherent multi-ply articles such as tires, for fabricating articles requiring seams between the adjoining portions, or requiring adherence between the vulcanizable composition and other material.

So-called synthetic rubber of the Buna S type which is a copolymer of butadiene and styrene polymerized in an aqueous suspension and certain types of reclaimed natural rubber are outstanding examples of materials of the rubber type which lack sufficient tackiness, bonding properties and plasticity for successful fabrication although many other rubber-like materials exhibit this deficiency to a greater or less degree. It has been proposed to add sufficient virgin natural rubber to such materials in order to impart the necessary plasticity, tackiness and bonding properties, but the amount of such virgin rubber required is usually sufficiently great to defeat the usual purpose of synthetic rubbers or reclaimed rubbers, which is the production of compositions usable instead of virgin rubber. I have found that the resin, when added to compositions of the type discussed above, not only imparts to the composition the necessary tackiness and plasticity for fabrication, but also produces excellent bonding in vulcanized products between the various plies or portions of the rubber or rubber-like material and between the rubber or rubber-like material and other materials such as metal, fabric, cords, etc., as well as preserving or increasing the desirable properties of the composition, such as modulus of elasticity, elongation, tensile strength, tear resistance, resistance to flex cracking, etc.

While successful bonding is, in general, not obtainable in the absence of substantial tackiness of vulcanizable compositions prior to vulcanization, such tackiness does not insure the production of an effective bond or the preservation of the desired properties above enumerated, since tackiness itself may be produced by various materials which have no effect upon or even decrease the bonding characteristics upon vulcanization or destroy or impair certain or all of the desired properties above referred to. The increased bonding effect of the resin may result at least in part from the fact that the agent is a viscous, sticky liquid or semi-liquid which is itself vulcanizable, i. e., it combines with sulfur or other known vulcanizing agents to form a more viscous, semi-liquid, plastic or solid material which adheres tenaciously to other materials.

I have further found that with certain rubber or rubber-like materials the resin may be added in sufficient amounts to form a very substantial portion of the composition before deleteriously affecting the properties of the rubber or rubber-like materials so that the resin may be employed as an extender to reduce the amount of rubber or rubber-like materials necessary for the production of a given article. In general the employment of substantial amounts of the resin also enables increased amounts of compounding ingredients or fillers such as carbon black, etc., to be employed without deleterious effect and in some cases even with improved results to still further decrease the amount of rubber or rubber-like materials required. Also the addition of the resin very materially increases the plasticity during milling of compositions containing rubber or rubber-like materials thus reducing the time and power required for milling of the composition and increasing the ease with which compounding ingredients may be added on the mill and the ease with which articles may be fabricated from the milled composition. It is therefore desirable to add the resin to the rubber or rubber-like materials early in the milling operation.

When even small amounts, for example 1 to 2 percent by weight of the resin on the basis of the rubber-like material employed, are incorporated into vulcanizable compositions containing synthetic rubbers which are deficient in tackiness, the plasticity and tackiness are increased sufficiently for most uses such as building up multi-ply articles or retreading tires and this adherence persists in the vulcanized product causing the various layers to tenaciously cohere or adhere to other materials such as previously vulcanized rubber fabric, etc. It is rarely necessary to employ more than 2% of the resin and no case has been found where more than 5% is required. Such small amounts of resin materially increase the workability of the composition and enable some increase in proportions of other compounding ingredients. The presence of the resin does not deleteriously affect the tensile strength, modulus of elasticity or elongation of the vulcanized composition and in some cases may even improve certain or all of these properties. In fact, with certain so-called synthetic rubber compositions, notably those containing Buna S, substantially no impairment of the desirable properties of the composition occur even when resin in amounts up to 15 or 20% or even 30%, depending upon the character of the rubber or rubber-like materials, is incorporated into the composition. That is, the composition does not begin to assume resin-like characteristics until the resin content approaches 20 to 30% of the rubber or rubber-like constituents. For example with Buna S, 5 to 20% of the resin may be advantageously employed as an extender although 2 to 5% is usually sufficient for producing the required tackiness. The large amounts of resin have the further advantage of enabling greater amounts of other desirable compounding ingredients, such as carbon black, to be employed. For example with Buna S, a product having specified properties as to tensile strength, elongation, etc., was compounded with approximately 50% carbon black on the basis of the synthetic rubber along with small amounts of other ingredients, such as zinc oxide, whereas with 15% added resin the amount of carbon black which could be employed to produce substantially the same properties was increased to 70%. Thus in the first composition the synthetic rubber was approximately 65% of the composition whereas in the composition containing 15% of the resin the synthetic rubber was approximately 57% of the total composition. The carbon black selected was channel black, a particularly "hard" black, and with softer blacks even greater amounts can be employed. Furthermore, the composition containing the resin exhibited excellent tackiness and plasticity before vulcanizing and developed strong bonding properties upon vulcanizing, characteristics as to which Buna S is notably deficient. Also, the composition containing the resin required much less milling time and power to thoroughly plasticize the same and incorporate the compounding ingredients.

Similar results can be obtained with compositions containing substantially any of the other synthetic rubbers. Thus, in many cases the resin can be employed in substantial amounts as an extender for synthetic rubbers such as neoprene, Buna N, Thiocols, etc., irrespective of whether it is necessary to increase the tackiness and bonding properties of the rubber-like materials. The amount of resin employed will depend upon the nature of the compounding ingredients used as well as that of the rubber or rubber-like materials and the characteristics of the article desired, so that no definite proportions can be given even for Buna S. In general, a small amount of resin, for example ½ to 5% is sufficient to supply a deficiency in plasticity, tackiness or bonding properties. In some compositions amounts up to 15 to 25% or even 30% can be employed without substantially modifying the rubber-like properties of the compositions but greater amounts, for example 40 to 50% or more produce resin-like products which may, however, have some of the characteristics of rubber. In general, it has been found that small amounts, for example ½ to 5%, usually ½ to 2% of the resin must be employed with natural rubber compositions if the desirable rubber-like properties of the compositions are retained. Thus with pure gum compositions, ½% of the resin is usually sufficient while with natural rubber compositions which are heavily loaded with fillers and other compounding ingredients, up to 5% may be employed although 2% is usually sufficient. As a general rule, the greater the amount of resin which is employed within the limits above given, the greater the amount of other compounding ingredients on the basis of the rubber or rubber-like materials which can be incorporated into the vulcanizable composition without unduly increasing the hardness of the vulcanized product. The resin may thus be considered a softening agent but differs from known softening agents in that it also increases tackiness and bonding properties and can be employed in sufficient amounts to produce the desired softening effect without also impairing the tensile strength, elongation, modulus of elasticity, etc. With certain rubber-like materials, notably Buna S, certain of these properties are materially improved. It will be apparent that the amounts and nature of the other compounding ingredients will vary as in the usual rubber technology depending upon the characteristics desired in the final product.

Vulcanization of rubber or rubber-like compositions containing the resin of the present invention is in general similar to vulcanization of the various compositions not containing the resin. Sufficient sulfur either as free sulfur or in compounds such as certain accelerators containing available sulfur or equivalent vulcanizing materials known to the art must be supplied in sufficient amounts to not only supply the demand of the rubber but also that of the resin. The amount of sulfur or other vulcanizing ingredient as well as the temperature and time of vulcanization will depend upon the desired hardness of the vulcanized product and temperature and time of vulcanization will also depend upon the amount and nature of any accelerators employed.

As specific examples showing compositions containing cativo resin in accordance with the present invention and comparisons between such compositions and other compositions, the following tables are given:

Table I

| | Composition | | | |
|---|---|---|---|---|
| | 1 | 2 | 3 | 4 |
| Buna S | 100 | 100 | 100 | 100 |
| Agerite white | 1 | 1 | 1 | 1 |
| Zinc oxide | 3 | 3 | 3 | 3 |
| Altax | 1.5 | 1.5 | 1.5 | 1.5 |
| D. P. G. | .5 | .5 | .5 | .5 |
| Sulfur | 2 | 2 | 2 | 2 |
| Thermax | 100 | 100 | 150 | 150 |
| Cativo resin | | 20 | 20 | 30 |

| Press cures at 290° F. | Tensile properties | | | | | | | | | | | |
|---|---|---|---|---|---|---|---|---|---|---|---|---|
| | S | T | E | S | T | E | S | T | E | S | T | E |
| 15 min | 1,035 | 1,275 | 400 | 425 | 1,400 | 940 | 820 | 1,325 | 720 | 530 | 1,065 | 920 |
| 30 min | 1,090 | 1,240 | 375 | 615 | 1,850 | 825 | 990 | 1,300 | 610 | 740 | 1,360 | 765 |
| 45 min | 1,165 | 1,350 | 390 | 655 | 1,815 | 735 | 1,030 | 1,260 | 550 | 810 | 1,380 | 715 |

| | Tear resistance | | | |
|---|---|---|---|---|
| 15 min | 140 | 175 | 210 | 200 |
| 30 min | 120 | 220 | 180 | 225 |
| 45 min | 115 | 180 | 180 | 200 |

| | Shore hardness | | | |
|---|---|---|---|---|
| 30 min | 63 | 50 | 61 | 55 |

Table II

| | Composition | | | |
|---|---|---|---|---|
| | 5 | 6 | 7 | 8 |
| Buna S | 100 | 100 | 100 | 100 |
| Agerite white | 1 | 1 | 1 | 1 |
| Zinc oxide | 3 | 3 | 3 | 3 |
| Altax | 1.5 | 1.5 | 1.5 | 1.5 |
| D. P. G. | .5 | .5 | .5 | .5 |
| Sulfur | 2 | 2 | 2 | 2 |
| P-33 | 100 | 100 | 100 | 150 |
| Cativo resin | | 20 | 30 | 30 |

| Press cures at 290° F. | Tensile properties | | | | | | | | | | | |
|---|---|---|---|---|---|---|---|---|---|---|---|---|
| | S | T | E | S | T | E | S | T | E | S | T | E |
| 15 minutes | 1,230 | 1,365 | 345 | 500 | 1,750 | 745 | 350 | 1,630 | 940 | 705 | 1,285 | 700 |
| 30 minutes | 1,255 | 1,270 | 310 | 610 | 1,800 | 660 | 480 | 1,885 | 815 | 340 | 1,250 | 610 |
| 45 minutes | 1,240 | 1,305 | 315 | 620 | 1,785 | 640 | 500 | 1,820 | 785 | 335 | 1,300 | 595 |

| | Tear resistance | | | |
|---|---|---|---|---|
| 15 minutes | 120 | 210 | 180 | 230 |
| 30 minutes | 115 | 195 | 170 | 200 |
| 45 minutes | 110 | 175 | 150 | 190 |

| | Shore hardness | | | |
|---|---|---|---|---|
| 30 minutes | 70 | 60 | 56 | 71 |

Table III

| | Composition | | | |
|---|---|---|---|---|
| | 9 | 10 | 11 | 12 |
| Buna S | 100 | 100 | 100 | 100 |
| Agerite white | 1 | 1 | 1 | 1 |
| Zinc oxide | 3 | 3 | 3 | 3 |
| Kalvan clay | 100 | 100 | | |
| Dixie clay | | | 100 | 100 |
| Altax | 1.5 | 1.5 | 1.5 | 1.5 |
| D. P. G. | .5 | .5 | .5 | .5 |
| Sulfur | 2 | 2 | 2 | 2 |
| Cativo resin | | 10 | | 10 |

| Press cures at 290° F. | Tensile properties | | | | | | | | | | | |
|---|---|---|---|---|---|---|---|---|---|---|---|---|
| | S | T | E | S | T | E | S | T | E | S | T | E |
| 15 minutes | 570 | 940 | 400 | 110 | 640 | 1,010 | 320 | 390 | 510 | 110 | 140 | 710 |
| 30 minutes | 570 | 770 | 345 | 270 | 1,270 | 620 | 590 | 1,100 | 580 | 330 | 1,070 | 780 |
| 45 minutes | 575 | 760 | 365 | 280 | 1,230 | 610 | 690 | 1,120 | 530 | 370 | 1,130 | 670 |

| | Tear resistance | | | |
|---|---|---|---|---|
| 15 minutes | 130 | 120 | 105 | 49 |
| 30 minutes | 105 | 105 | 160 | 110 |
| 45 minutes | 120 | 105 | 160 | 110 |

| | Shore hardness | | | |
|---|---|---|---|---|
| 30 minutes | 59 | 52 | 61 | 51 |

Table IV

| | Composition | | |
|---|---|---|---|
| | 13 | 14 | 15 |
| Buna S | 100 | 100 | 100 |
| Agerite white | 1 | 1 | 1 |
| Zinc oxide | 3 | 3 | 3 |
| Channel black (hard carbon black) | 60 | 60 | 60 |
| Altax | 1.5 | 1.5 | 1.5 |
| D. P. G. | .5 | .5 | .5 |
| Sulfur | 2 | 2 | 2 |
| Cativo resin | | 20 | |
| Pine tar | | | 20 |

| Press cures at 290° F. | Tensile properties | | | | | | | | |
|---|---|---|---|---|---|---|---|---|---|
| | S | T | E | S | T | E | S | T | E |
| 15 min | 1,830 | 2,710 | 390 | | | | | | |
| 30 min | 2,730 | 2,890 | 330 | 1,335 | 2,530 | 460 | 930 | 2,130 | 520 |
| 45 min | 2,930 | 2,970 | 310 | 1,565 | 2,710 | 450 | 1,095 | 2,280 | 480 |
| 60 min | | | | 1,635 | 2,890 | 430 | | 2,340 | 450 |

| | Tear resistance | | |
|---|---|---|---|
| 15 min | 220 | | |
| 30 min | 210 | 155 | 180 |
| 45 min | 160 | 200 | 210 |
| 60 min | | 200 | 195 |

| | Shore hardness | | |
|---|---|---|---|
| 30 min | 68 | 59 | 55 |

Table V

| | Composition | | |
|---|---|---|---|
| | 16 | 17 | 18 |
| Buna S | 100 | 100 | 100 |
| Agerite white | 1 | 1 | 1 |
| Zinc oxide | 3 | 3 | 3 |
| P-33 (soft carbon black) | 100 | 100 | 100 |
| Altax | 1.5 | 1.5 | 1.5 |
| D. P. G. | .5 | .5 | .5 |
| Sulfur | 2 | 2 | 2 |
| Cativo resin | | 20 | |
| Gum thus (crude turpentine) | | | 20 |

| Press cures at 290° F. | Tensile properties | | | | | | | | |
|---|---|---|---|---|---|---|---|---|---|
| | S | T | E | S | T | E | S | T | E |
| 15 min | 1,150 | 1,465 | 405 | 575 | 1,845 | 760 | 230 | 410 | 920 |
| 30 min | 1,195 | 1,395 | 390 | 655 | 1,810 | 710 | 320 | 600 | 880 |
| 45 min | 1,240 | 1,395 | 360 | 680 | 1,690 | 665 | 350 | 590 | 770 |

| | Tear resistance | | |
|---|---|---|---|
| 15 min | 175 | 220 | 100 |
| 30 min | 150 | 190 | 130 |
| 45 min | 150 | 220 | 130 |

| | Shore hardness | | |
|---|---|---|---|
| 30 min | 65 | 55 | 72 |

In the above tables under "Tensile properties," "S" refers to the stress in pounds per square inch of the original cross-section at 300% elongation usually referred to in the rubber art as the modulus of elasticity; "T" refers to the tensile stress at rupture in pounds per square inch of the original cross-section; and "E" refers to the percent elongation at rupture of specimens subjected to test in a standard testing machine. The tear resistance is given in pounds per tenth of an inch thickness as the stress necessary to tear a crescent shaped specimen providing differential tension between the two curved edges in accordance with the standard Goodrich method while the hardness was determined with the Shore durometer.

In the various compositions above given, Agerite white is N,N'di-beta-naphthyl-para-phenylenediamine (an age resistor); Altax is benzol-thiozyl disulphide (an accelerator); D. P. G. is diphenylguanidine (an accelerator); Thermax is a soft carbon black; P-33 is another soft carbon black; Kalvan is a clay employed in many rubber compositions, and the same is true of Dixie clay; channel black is a hard carbon black and gum thus is a crude, almost solid, turpentine. While for the purpose of providing comparative tests, Buna S has been employed as the rubber-like material throughout the above examples, it is to be understood that similar results can be obtained with other synthetic rubbers.

Referring to Table I, it will be noted that the composition 2 which differs from composition 1 solely by the addition of 20% resin developed a much higher tensile strength after vulcanization as well as a much lower modulus and a much higher elongation. The tear resistance was also substantially doubled although the hardness was considerably decreased. In interpreting the figures under the heading "Tensile properties" in all of the tables, the greatest figure in any column is usually given the greatest weight as even slight changes in composition will frequently vary the curing time for optimum properties and in commercial operations the curing time which develops the desired properties is selected. The same is true for tear resistance.

A comparison of compositions 1, 2, and 3, the latter of which differs from composition 2 only by a 50% increase of carbon black, shows that increasing the carbon black somewhat reduces the tensile strength and increases the hardness while at the same time increasing the modulus and somewhat decreasing the elongation. In fact a comparison of compositions 1 and 3 will show that the physical properties are of substantially the same order in both of these compositions, although composition 3 contains 50% more carbon black and 20% cativo resin. Thus, composition 3 which contains approximately 35% Buna S has substantially the same physical properties as composition 1 which contains approximately 48% Buna S. Composition 4 which differs from composition 3 by the addition of more cativo resin is still a good product in comparison with composition 1 although it contains even less Buna S.

Referring to the examples of Table II, which differ essentially from the examples of Table I by the employment of a different carbon black, it will be noted that equivalent compositions produce about the same result with either Thermax carbon black or P-33 carbon black, the only major difference being that the P-33 carbon black maintains the hardness more nearly the same as cativo resin is added.

The compositions of Table III in comparison with the compositions of Tables I and II show that soft carbon black are much more effective in developing high tensile strength and other desirable properties with synthetic rubber compositions than is the case with clays. It will be noted that the presence of small amounts of cativo resin very materially increase the tensile strength and the elongation of compositions containing Kalvan clay, but was not as effective with Dixie clay.

Referring to Table IV it will be noted by comparison of compositions 13 and 14, that the addition of 20% cativo resin left the tensile strength of compositions containing a hard carbon black approximately the same while decreasing the modulus and increasing the elongation. The tear resistance remained substantially the same while the hardness was somewhat decreased. Composition 15 in comparison with composition 14 shows that pine tar, a common plasticizer in rubber compositions, is not the equivalent of cativo resin as this material very much lowered the tensile strength and hardness although the elongation was increased and the modulus lowered.

Referring to Table V, compositions 16 and 17 therein contain the same materials in the same proportions as compositions 5 and 6, respectively, of Table II, but were made and vulcanized on a different date. The properties of the equivalent compositions agree very closely, but due to unavoidable slight differences in procedure, particularly in vulcanizing conditions, are not identical. Table V is given to compare the effect of cativo resin and gum thus upon the physical properties of Buna S compositions. Compositions 16 and 17 duplicate compositions 5 and 6 of Table II in order to provide a comparison with composition 18 which was processed under the same conditions as compositions 16 and 17. It will be noted that the addition of 20% cativo resin to composition 16 to produce composition 17, very materially increases the tensile strength, decreases the modulus and increases the elongation and resistance to tear, while decreasing the hardness. On the other hand, gum thus decreased the tensile strength to about half that of composition 16, although it decreased the modulus and increased the elongation, but also materially decreased the tear resistance while at the same time very much increasing the hardness.

From the above examples it will be seen that the addition of substantial amounts of cativo resin to conventional vulcanizable rubber-like compositions containing Buna S in general improves the desirable qualities of such compositions, particularly those containing soft carbon blacks. In any event there is, in general, no impairment of the desirable qualities. Also, in general, additional amounts of fillers can usually be employed in compositions containing the resin to produce vulcanized compositions having properties similar to those containing no cativo resin. Thus, the resin functions as an extender for the rubber-like material. As stated above, similar results can be obtained with other rubber-like materials and, in addition, the vulcanizable composition is plasticized to produce easier milling and incorporation of compounding ingredients and the tackiness of the vulcanizable composition is materially increased while the bonding properties of the vulcanized composition are at the same time increased.

It is within the contemplation of the present invention to produce as an article of manufacture a compounding ingredient for sale to rubber manufacturers in the form of a composition of matter including resin, sulfur or other vulcanizing agent, accelerators, age resistors, etc., in proper proportions so that this material may be merely added to rubber or rubber-like material on the mill. Thus, the sulfur can be easily admixed with the resin to produce a substantially uniform mixture and the resin functions as a carrier to distribute the sulfur substantially uniformly throughout the rubber mix. No reaction between the sulfur and the resin takes place at ordinary temperatures and this is true even in the presence of the majority of accelerators employed in rubber technology. Thus, a mixture containing the resin, sulfur and accelerator may be produced and marketed and in this mixture may also be incorporated an age resistor and even carbon black or other filler as well as zinc oxide or equivalent material. It will be apparent that the resin will thereby form a carrier for all of the compounding ingredients for a desired rubber composition and enable these to be easily and uniformly distributed throughout the rubber or rubber-like material on the mill.

The resin of the present invention is an advantageous ingredient of rubber adhesives. Such adhesives are generally unvulcanized compositions containing rubber or rubber-like materials and desirably have a permanent tack. The resin increases the tackiness of such adhesives and because of its high stability, i. e., resistance to oxidation, drying, etc., the adhesives do not lose their desirable properties over long periods of time. It forms an effective adhesive ingredient in such produces as rubber tape for electrical insulation or in friction tapes. Also, rubber adhesives containing the resin may either be employed as a solution in rubber solvents or as an aqueous suspension, for example in rubber cements or shoe cements. The resin is not soluble in water but may be easily emulsified in water by substantially any of the known emulsifying agents tending to produce oil-in-water emulsions. Thus the resin may be incorporated into natural or artificial latex cements. In rubber adhesives the resin is employed as a minor ingredient, that is from small percentages of 1 or 2% to about 40% depending upon the properties desired. Higher percentages of the resin cause adhesives to take on the properties of the resin modified somewhat by the presence of the rubber or rubber-like materials.

The resin is, however, a desirable ingredient in adhesives in general. With adhesives that require a permanent tack, for example adhesives of the type employed upon scotch tape, the resin may be employed either in its natural form after removal of volatile materials or as a distilled product without modifying the resin to harden or solidify the same. If desired, the viscosity of the resin may be increased by reaction with a small amount of sulfur or other vulcanizing ingredient if the presence of this material is unobjectionable, or by reaction with small amounts of alkaline oxides such as magnesium oxide or calcium oxide. Furthermore, for surgical tape the resin may be compounded with zinc oxide as it does not react therewith at ordinary temperatures. The resin is soothing to inflamed tissue and therefore makes a particularly effective adhesive for surgical tape. As the resin is soluble in hydrocarbon solvents it may be applied to tape in such solvents or may be merely calendered upon the surface of the tape.

The reaction products of the resin and sulfur or oxides, or both as above described, applied in a suitable solvent make particularly effective adhesives for cementing leather, fabric, or other materials together and may, therefore, be employed as a shoe cement, etc. By reaction with insufficient sulfur or oxides, or both, to render the resin brittle or hard, a permanently flexible cement can be produced. Since the reaction products referred to are easily emulsified in water the cements may also be produced as water emulsions. Such emulsions can be produced by employing an alkali metal compound which has an alkaline reaction as the emulsifying agent, but improved emulsions may be produced with more powerful emulsifying agents such as amino soaps. Thus the addition of small amounts of triethanolamine and oleic acid, or similar fatty acid, forms an extremely stable emulsion which upon evaporation of the water or driving off of the water and amine by heat, results in an adhesive layer which adheres tenaciously to nearly all materials. Other amines such as isopropyl amine with fatty acids and even alkaline soaps such as alkali metal salts of fatty acids may be employed as the emulsifying agent, and as stated above, nearly any emulsifying agent which tends to form an oil-in-water emulsion may be employed.

Adhesive compositions consisting essentially of the resin, either alone or reacted with sulfur or oxides or both to produce more viscous semi-liquids or thermo-plastic solids are particularly effective as a mica binder. The binder may be applied to the mica either by heating to reduce its viscosity or in a solvent or as an emulsion and adheres tenaciously thereto. Mica is a peculiar substance having a surface to which very few materials adhere. In general, the materials which adhere to mica are either not stable against thermal decomposition at relatively high temperatures or are not stable against oxidation. Shellac is still the most generally used mica binder in spite of a tremendous amount of research in an effort to find more suitable mica binders. Shellac has excellent adhesive properties for mica but will not withstand the high temperatures desirably employed in many types of electrical machinery without deterioration. Thus the temperature which may be employed in electrical apparatus having laminated mica insulation bonded with shellac is limited to relatively low temperatures. On the contrary, the resin or reaction products of the resin above referred to are stable at extremely high temperatures and while such reaction products are, in general, thermo-plastic, the reaction in producing the reaction products may be carried sufficiently far that the resin products remain solid at such high temperatures. In addition the resin or resin products have high dielectric strength and are non-hygroscopic, thus, producing laminated mica structures which are particularly suitable for electrical insulation either in the form of flexible mica tape or sheets, or harder products usable for commutator insulation, etc. The laminated mica structures employing the resin or resin reaction products are also suitable for non-electrical uses or for employment for electrical insulation where temperatures are not a factor. The flame resistant and non-oxidizing properties of the resin, however, render it particularly suitable for laminated mica structures subjected to high temperatures.

Because of its stability in remaining permanently adhesive without becoming brittle, the resin compositions of the present invention are particularly suitable as an anchor for fiber pile in the manufacture of pile textiles. For such structures the resin is desirably combined with rubber or rubber-like materials, cellulose acetate, ethyl acetate, or the like. Many pile fabrics at the present time are manufactured with a single loop of pile over a supporting cord in the fabric and are anchored thereto with an adhesive, usually a rubber latex adhesive. By combining the resin of the present invention, either in its unreacted form or partially reacted, with sulfur or oxides, as above described, the amount of rubber necessary for anchoring the pile can be greatly reduced and also such materials as cellulose acetate or ethyl cellulose can be rendered permanently adhesive and flexible so that the rubber can be entirely omitted. In general, considerably more of the resin will be employed with the acetate, etc., than with rubber.

The adhesive properties of the resin render it an advantageous addition to paints and varnishes. It is compatible with vegetable oils such as linseed oil, tung oil, or soya bean oil and causes the paint or varnish when added thereto in small amounts to more tenaciously adhere to surfaces to be covered and also to have greater covering power. It also renders the film produced permanently elastic and imparts flame resistant properties thereto. Since it is a non-drying material it will ordinarily be added in amounts less than approximately 10%. Even in these small proportions it constitutes an excellent medium for distributing the pigments in the carrier and may be employed as the medium in which the pigments are ground. In addition to employment in varnishes and paints it is particularly suitable as an ingredient in lacquers, for example ethyl cellulose lacquers in hydrocarbon solvents. The resin plasticizes the ethyl cellulose or other lacquer base to make a more flexible film and also increases the bonding power of the lacquer, i. e., its adherence to surfaces. Thus it is advantageously used in lacquers, particularly for primer coats. As in the case with varnishes and paints, the resin is an excellent medium for carrying the pigments into the lacquer composition and may be advantageously employed as a medium for grinding the pigments. It has somewhat the same effect as castor oil or other plasticizing material in lacquers, but in addition increases the adherence of the film to surfaces to be covered as well as the covering power of the films. The resin may be substituted for castor oil in most compositions in which castor oil is employed as a plasticizer but has the additional advantage over castor oil of increasing the adhesive properties of such compositions. In producing lacquers from such material as ethyl cellulose the resin may be employed in relatively large amounts, for example, 40 to 55% of the ethyl cellulose. In amounts approaching approximately 60% resin and 40% ethyl cellulose the film becomes tacky and retains a permanent tack. Such compositions may be employed on scotch tape or as an adhesive plastic composition similar to materials sometimes called ethyl rubber.

The resin also increases the adhesive properties of various other materials, for example mastics employed for cementing tile to floors or walls and consisting primarily of tars and waxes. It also increases the adhesive properties of most waxes, for example carnauba wax, or other vegetable or mineral waxes. Thus, compositions containing waxes and the resin have greater adherence to surfaces. The resin also imparts greater adhesiveness to compositions containing insoluble soaps such, for example, as gear grease. Gear grease, in general, consists of insoluble soaps such as aluminum soaps, magnesium soaps, etc., forming a porous structure which carries mineral oil of the correct viscosity for the particular lubrication application. Such gear greases, in general, have poor adherence to metal surfaces and are frequently thrown from the surfaces to be lubricated by rotation of the gears. Gear grease compositions containing a small amount of the resin, for example 1 to 5%, develop excellent adherence and remain substantially uniformly distributed over the friction surfaces.

It is well known that factice which is a vulcanized vegetable oil or similar material, i. e., a reaction product of sulfur and vegetable oils, is a material having some of the properties of rubber. Such material does not, however, lend itself to molding operations as it does not flow readily in the mold during such molding operation. The addition of even small amounts of the resin plasticizes the factice and causes it to readily flow so as to enable it to be formed into any desired shape. Also, factice, as ordinarily produced, crumbles or has poor adherence between the particles thereof. The resin acts as a binder for the factice producing a structurally strong material which may be employed for many purposes. Factice has been commonly employed as a minor ingredient in rubber erasers to enable the rubber to be more easily removed from the eraser during the erasing operation so as to carry the graphite removed from the paper away from the surface of the eraser and leave a clean erasing surface. Also the factice tends to prevent the rubber particles from sticking to the surface being erased. Factice alone, however, does not make a good eraser as it is too crumbly. It has been found, however, that a composition containing factice and a small amount of the resin of the present invention produces a structurally strong eraser which retains a clean erasing surface and does not adhere to the surface being erased. A small amount of ethyl cellulose in the composition still further improves the structural strength and other properties of the eraser. Excellent erasers have thus been produced having no rubber in their composition.

The resin of the present invention is also an effective plasticizer for many plastic compositions such as ethyl cellulose and various thermo-plastic or thermo-setting resins. Ethyl cellulose under the trade name "Lucite" is employed for many structures requiring lightness and high mechanical strength as well as the ability to be machined and take a high polish. An outstanding example is the making of fountain pen bodies. The ethyl cellulose itself is a hard material which is quite brittle and requires a softening or plasticizing material in order to develop mechanical strength. Ethyl cellulose compositions containing the resin develop high tensile strength as well as resistance to fracture and, in addition, are much more machineable than ethyl cellulose compositions containing known plasticizers. Thus ethyl cellulose containing approximately 15 to 25% of the resin may be turned, drilled or threaded, for example in the manufacture of fountain pen bodies, much more easily than conventional ethyl cellulose compositions. The resin appears not only to increase the strength and resistance of the fracture of ethyl cellulose but also to lubricate the material during machining and polishing operations. The amount of resin employed will of course depend upon the desired properties of the ethyl cellulose composition.

The resin is also an effective plasticizer in compositions containing vinyl resins, etc., as well as substantially all of the synthetic thermo-plastic resins or the thermo-setting resins such as the phenol formaldehyde or urea formaldehyde resins. The presence of the cativo resin increases the mechanical strength of the resins and also makes them less brittle. Thus the resin is a desirable ingredient in molding compositions and also as binders for wallboard, friction elements, plyboard, etc. In addition to increasing the flexibility and strength of the synthetic resins in wallboard and plywood, it imparts excellent flame resistant properties thereto and also increases the bonding properties of the resins. The reaction products with either sulfur or oxides or both, as above described, provide an excellent binder for wallboard or plyboard, etc., either alone or in combination with synthetic resins. Because of their high thermal stability the reaction products referred to make excellent binders for friction elements such as brake or clutch facings, either alone or in conjunction with thermo-setting resins. Thus by reacting the material with sufficient sulfur or oxides, or both, a product can be produced which will not soften at the high temperatures to which such friction elements are subject.

The cativo resin either in its natural state or the distilled product, can advantageously be employed to produce impregnated paper products. Impregnation of the paper with the resin renders the same transparent or translucent and these characteristics may be obtained without employing sufficient resin to render the paper tacky. The reaction products above described may also be employed in a similar manner. The paper may be impregnated with the resin or reaction products either in a solvent or in an emulsion as above described and upon evaporation of the solvent or water a transparent paper is produced. The paper remains permanently flexible and because of the high stability of the resin against oxidation the impregnated paper does not change its properties upon aging. Furthermore, the resin renders the paper highly resistant to flame. By carefully distilling the resin, its odor can be eliminated and the impregnated paper, therefore, forms an advantageous material for packaging foods or other materials which it is desired to protect from the air, as it imparts no odor or flavor to the materials. Since the resin and reaction products have good dielectric properties the impregnated paper is particularly suitable for electrical insulation in substantially any structure in which oil impregnated or wax impregnated paper is employed, for example the insulation of wires in telephone cables or in the production of electrical condensers. The resin also renders the paper resistant to moisture. The resin or harder reaction products referred to may also be employed in sufficient amount to enable the paper to be laminated into paperboard with the resin or reaction products functioning as the binder therein.

Instead of impregnating the paper after formation, the resin may be incorporated in the paper during the manufacture thereof, for example by adding the resin to the beater. Thus the resin may be added to the beater in substantial amounts in the form of an emulsion and is absorbed by the cellulosic fibers. Also, the harder reaction products of the resin with sulfur or oxides may be added to the beater in substantially the same manner as rosin size or other conventional sizes added thereto. The resin compositions may be precipitated on the fibers in substantially the same manner as such sizes to produce a filled paper having flame resisting properties. By employing a relatively large amount of such reaction products they may constitute a binder for the fibers in the paper and since the reaction products are thermo-plastic, relatively thick sheets or multi-ply sheets can be compacted under heat and pressure into paperboard structures having high mechanical strength.

Since the resin or reaction products thereof are absorbed by cellulosic fibers, they may, therefore, be employed to produce flame resisting wood by impregnating the same by use of a solvent which is evaporated from the wood or by use of elevated temperatures to reduce the viscosity of the impregnant. Fabrics may also be impregnated with sufficient resin or its reaction products to impart flame resisting properties thereto without materially changing the properties of the fabric. While the impregnation of fabric containing cellulose fibers is particularly advantageous, other fabrics such as wool fabrics may be impregnated to give them flame resisting properties. Such impregnation may be carried out by saturating the fabric either with a solvent solution or emulsion of the resin or reaction products thereof.

The resin also is an advantageous plasticizer for cellulosic fibers such as rayon produced by any of the rayon processes such as the cellulose acetate, viscose, or cuprammonium processes. The resin may be added to the degenerated cellulose either in the form of an emulsion or in a solvent compatible with the degenerated cellulose and upon regeneration of the cellulose the resin forms an integral part of the fibers. The resin not only plasticizes and renders the fibers more flexible, but also imparts flame resisting properties thereto and increases their resistance to moisture absorption. If desired, sufficient resin may be employed to render the fibers slightly tacky so as to enable stronger threads to be produced by twisting the fibers together. In general the resin also increases the tensile strength of the fibers. It will be apparent that the resin may be employed as a plasticizer in any process involving the regeneration of cellulose such as the production of sheet products usually sold under the trade name Cellophane. As in the case of the textile fibers made from regenerated cellulose, the resin increases the flexibility of the material as well as its flame resistant properties and resistance to moisture absorption.

While cativo resin has been specifically discussed above, resins from other related trees or plants may also be employed. It has been found that the resin from the copaiba tree (*Copaifera officinalis*) is essentially similar to the resin from the cativo tree except that it usually contains a greater amount of volatile material or essential oils which can be removed by heating. This tree is found throughout tropical America and is classified in the same sub-family and tribe as the cativo tree. There are a large number of species of trees classified under the genus Copaifera, many of which also yield resins having the characteristics of cativo resin although the cativo tree is placed under a different genus, namely, Prioria, and represents the only known species under that genus. It can, therefore, be reasonably predicted that many other trees or shrubs classified under the tribe Cynometreae will also yield resins having the characteristics of cativo resins and that the same is true of trees or shrubs classified under the sub-family Caesalpinioideae. The botanical classification for this sub-family is as follows:

Family—Leguminosae
Sub-family—Caesalpinioideae
Tribe—Cynometreae
    Genus—Cynometra, about 25 species
    Genus—Pterogyne, 1 species
    Genus—Prioria, 1 species, copaifera (cativo tree)
    Genus—Copaifera, about 35 species including officinalis (copaiba tree)
Tribe—Amherstieae
    Genus—Hymenaea, about 10 species
    Genus—Eperua, about 8 species There is also a related sub-family of plants under the Leguminosae family with respect to which it can also be reasonably predicted that certain species will yield resins having properties in common with cativo resin. This is the sub-family Papilionatae, the botanical classification of this sub-family being as follows:

Family—Leguminosae
Sub-family—Papilionatae
Tribe—Dalbergieae
    Genus—Pterocarpus, about 20 species
    Genus—Dipteryx, about 10 species
Tribe—Sophoreae
    Genus—Myroxylon, about 12 species
    Genus—Myrocarpus, about 2 species The present invention is, therefore, concerned with compositions containing resins having the characteristics of the resin from the cativo tree, particularly the resins from the resin yielding plants of the sub-family Caesalpinioideae of the Leguminosae family of plants as well as those from the resin yielding plants of the sub-family Papilionatae of the same family of plants, the more important characteristic of said resins being that they consist essentially of resin acids of high molecular weight, are substantially non-oxidizing and non-drying, are highly resistant to thermal decomposition, have flame resistant properties, are vulcanizable and have excellent adhesive properties.

While I have disclosed the preferred embodiment of my invention, it is understood that the details thereof may be varied within the scope of the following claims.

I claim:

1. A composition of matter comprising ethyl cellulose and a resin selected from the group consisting of cativo resin and copaiba resin.

2. A solid composition of matter comprising essentially ethyl cellulose and a resin selected from the group consisting of cativo resin and copaiba resin, said resin being present in an amount between approximately 15 and 25 per cent of the ethyl cellulose.

3. A solid composition of matter comprising ethyl cellulose, factice and a resin selected from the group consisting of cativo resin and copaiba resin.

4. An adhesive composition comprising ethyl cellulose, a solvent for said ethyl cellulose and a resin selected from the group consisting of cativo resin and copaiba resin.

5. A lacquer comprising ethyl cellulose, a solvent therefor and a resin selected from the group consisting of cativo resin and copaiba resin, said resin being present in an amount between approximately 40 and 55 per cent of the ethyl cellulose.

NEIL E. TILLOTSON.